US008514457B2

(12) United States Patent
Ishii

(10) Patent No.: US 8,514,457 B2
(45) Date of Patent: Aug. 20, 2013

(54) INFORMATION EXTRACTION APPARATUS, INFORMATION EXTRACTION METHOD, INFORMATION-EXTRACTION COMPUTER PROGRAM PRODUCT, AND STORAGE MEDIUM

(75) Inventor: Masaki Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 554 days.

(21) Appl. No.: 12/779,245

(22) Filed: May 13, 2010

(65) Prior Publication Data

US 2010/0296109 A1  Nov. 25, 2010

(30) Foreign Application Priority Data

May 20, 2009  (JP) ................................. 2009-121639

(51) Int. Cl.
*H04N 1/32*  (2006.01)
(52) U.S. Cl.
USPC ......... 358/3.28; 358/3.29; 358/1.18; 382/232
(58) Field of Classification Search
None
See application file for complete search history.

(56) References Cited

U.S. PATENT DOCUMENTS

| | | | | |
|---|---|---|---|---|
| 6,052,489 A * | 4/2000 | Sakaue | | 382/266 |
| 7,426,284 B2 * | 9/2008 | Ishii | | 382/100 |
| 7,551,753 B2 * | 6/2009 | Kitora | | 382/100 |
| 7,590,289 B2 | 9/2009 | Ishii et al. | | |
| 7,649,637 B2 * | 1/2010 | Wiebe et al. | | 358/1.11 |
| 7,660,020 B2 * | 2/2010 | Ishii | | 358/3.28 |
| 7,668,336 B2 * | 2/2010 | Ishii | | 382/100 |
| 7,706,026 B2 * | 4/2010 | Ishii | | 358/3.28 |
| 7,715,055 B2 * | 5/2010 | Abe et al. | | 358/3.28 |
| 8,009,860 B2 * | 8/2011 | Ishii | | 382/100 |
| 8,014,559 B2 * | 9/2011 | Ishii | | 382/100 |
| 8,054,508 B2 * | 11/2011 | Ishii | | 358/3.28 |
| 8,228,564 B2 * | 7/2012 | Hara | | 358/3.28 |
| 8,248,666 B2 * | 8/2012 | Kenji | | 358/3.29 |
| 2002/0082879 A1 * | 6/2002 | Miller et al. | | 705/5 |
| 2005/0152006 A1 * | 7/2005 | Abe et al. | | 358/3.28 |
| 2006/0164693 A1 | 7/2006 | Matsumoto et al. | | |
| 2006/0193525 A1 * | 8/2006 | Ishii | | 382/232 |

(Continued)

FOREIGN PATENT DOCUMENTS

| | | |
|---|---|---|
| EP | 1852806 A1 * | 11/2007 |
| JP | 2734643 | 1/1998 |
| JP | 2004-248246 | 9/2004 |
| JP | 2006-238119 | 9/2006 |

OTHER PUBLICATIONS

Kappos, David J., Subject Matter Eligibilty of Computer Readable Media, Feb. 23, 2010, USPTO, 1351 OG 212.*

*Primary Examiner* — Ted Barnes
(74) *Attorney, Agent, or Firm* — Cooper & Dunham LLP

(57) ABSTRACT

Tools are provided for (i) obtaining image data in which information is embedded by printing multiple types of patterns in a matrix, (ii) calculating multiple vertical-line-segment sequences and multiple horizontal-line-segment sequences, obtained by connecting vertically arranged patterns and horizontally arranged patterns, respectively, in the image data with polygonal lines, (iii) searching for a vertical line segment and a horizontal line segment intersecting with each other for each combination of one of the vertical-line-segment sequences and one of the horizontal-line-segment sequences, (iv) calculating an intersection point between the thus-found vertical line segment and the horizontal line segment as a position of a pattern, and (v) extracting the information embedded in the printed material by identifying types of patterns at the calculated intersection points.

10 Claims, 11 Drawing Sheets

(56) References Cited

U.S. PATENT DOCUMENTS

| | | | |
|---|---|---|---|
| 2006/0210193 A1* | 9/2006 | Ishii | 382/284 |
| 2007/0140566 A1* | 6/2007 | Lin et al. | 382/203 |
| 2007/0206229 A1* | 9/2007 | Ishii | 358/3.28 |
| 2007/0217651 A1* | 9/2007 | Ishii | 382/100 |
| 2008/0144115 A1* | 6/2008 | Ishii | 358/3.28 |
| 2008/0192300 A1* | 8/2008 | Kenji | 358/3.29 |
| 2008/0231907 A1* | 9/2008 | Ishii | 358/3.28 |
| 2009/0063932 A1* | 3/2009 | Ishii | 714/758 |
| 2009/0103137 A1* | 4/2009 | Ishii | 358/1.17 |
| 2009/0245645 A1* | 10/2009 | Xing | 382/189 |
| 2010/0240391 A1* | 9/2010 | Povey | 455/456.1 |
| 2011/0063642 A1* | 3/2011 | Greim | 358/1.9 |

* cited by examiner

FIG. 5

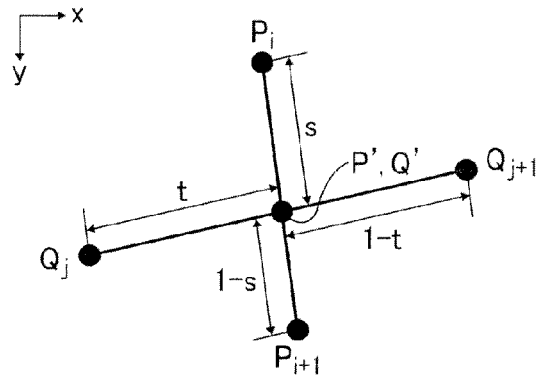

FIG. 6

| CRITERIA | RESULT OF DETERMINATION |
|---|---|
| $0 \leq s \leq 1$ and $0 \leq t \leq 1$ | SUBSTANTIALLY-VERTICAL LINE SEGMENT $P_iP_{i+1}$ AND SUBSTANTIALLY-HORIZONTAL LINE SEGMENT $Q_jQ_{j+1}$ ARE INTERSECTING (POINT P' IS ON SUBSTANTIALLY-VERTICAL LINE SEGMENT $P_iP_{i+1}$ AND POINT Q' IS ON SUBSTANTIALLY-HORIZONTAL LINE SEGMENT $Q_jQ_{j+1}$) |
| $s < 0$ | SUBSTANTIALLY-VERTICAL LINE SEGMENT $P_iP_{i+1}$ AND SUBSTANTIALLY-HORIZONTAL LINE SEGMENT $Q_jQ_{j+1}$ ARE NOT INTERSECTING (POINT P' IS ON HALF LINE EXTENDING FROM $P_i$ OF SUBSTANTIALLY-VERTICAL LINE SEGMENT $P_iP_{i+1}$) |
| $1 < s$ | SUBSTANTIALLY-VERTICAL LINE SEGMENT $P_iP_{i+1}$ AND SUBSTANTIALLY-HORIZONTAL LINE SEGMENT $Q_jQ_{j+1}$ ARE NOT INTERSECTING (POINT P' IS ON HALF LINE EXTENDING FROM $P_{i+1}$ OF SUBSTANTIALLY-VERTICAL LINE SEGMENT $P_iP_{i+1}$) |
| $t < 0$ | SUBSTANTIALLY-VERTICAL LINE SEGMENT $P_iP_{i+1}$ AND SUBSTANTIALLY-HORIZONTAL LINE SEGMENT $Q_jQ_{j+1}$ ARE NOT INTERSECTING (POINT Q' IS ON HALF LINE EXTENDING FROM $Q_j$ OF SUBSTANTIALLY-HORIZONTAL LINE SEGMENT $Q_jQ_{j+1}$) |
| $1 < t$ | SUBSTANTIALLY-VERTICAL LINE SEGMENT $P_iP_{i+1}$ AND SUBSTANTIALLY-HORIZONTAL LINE SEGMENT $Q_jQ_{j+1}$ ARE NOT INTERSECTING (POINT Q' IS ON HALF LINE EXTENDING FROM $Q_{j-1}$ OF SUBSTANTIALLY-HORIZONTAL LINE SEGMENT $Q_jQ_{j+1}$) |

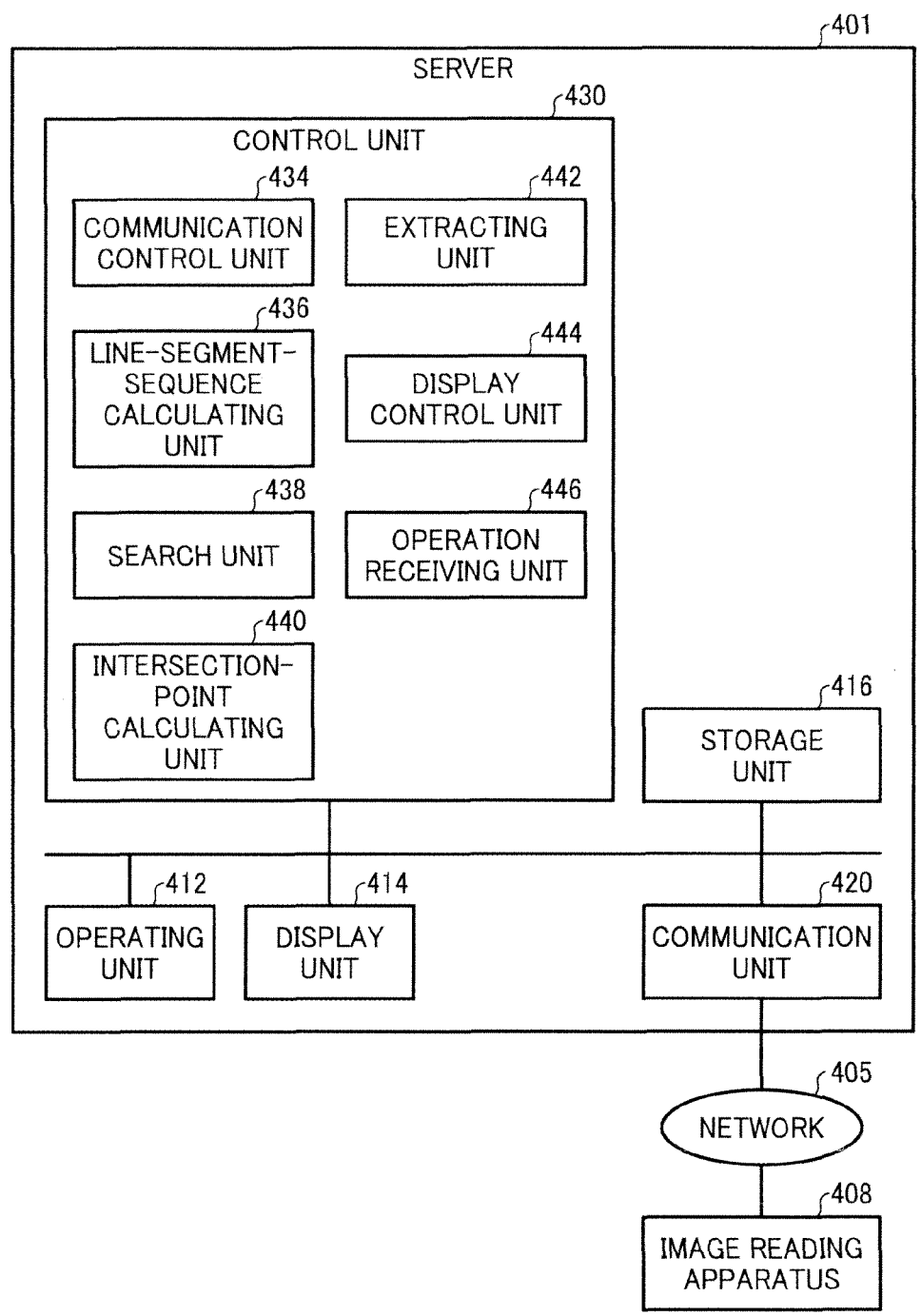

INFORMATION EXTRACTION APPARATUS, INFORMATION EXTRACTION METHOD, INFORMATION-EXTRACTION COMPUTER PROGRAM PRODUCT, AND STORAGE MEDIUM

CROSS-REFERENCE TO RELATED APPLICATIONS

The present application claims priority to and incorporates by reference the entire contents of Japanese Patent Application No. 2009-121639 filed in Japan on May 20, 2009.

BACKGROUND OF THE INVENTION

1. Field of the Invention

The present invention is directed generally to an information extraction apparatus, an information extraction method, an information-extraction computer program product, and a storage medium.

2. Description of the Related Art

Information embedding techniques of additionally embedding some type of information in image data to be printed, such as a document image, when the image data is printed have conventionally been known. Some information embedding techniques use dot patterns.

For instance, in one of such techniques that use dot patterns, desired information is embedded in a printed material by printing a matrix of dot patterns, each of which is a minimum information unit, in a background of the printed material, and the embedded information is extracted by reading the printed material with a scanner or the like, and identifying each dot pattern in the thus-read image to restore the information (see, for instance, Japanese Patent Application Laid-open No. 2006-238119).

For identification of dot patterns by using such a technique as discussed above, it is necessary to specify a position of each dot pattern first, which can be attained by, as is disclosed in Japanese Patent Application Laid-open No. 2006-238119, approximating each of horizontal rows of dot patterns and vertical rows of dot patterns by a straight line, and calculating a point of intersection between the thus-approximated straight lines.

There can be employed another technique of approximating each of horizontal rows of dot patterns and vertical rows of the dot patterns by a polygonal line or a curve and calculating a point of intersection between the thus-approximated polygonal lines or curves so as to allow for distortion that can be mechanically caused in an image read by a scanner, or the like, as disclosed in Japanese Patent Application Laid-open No. 2006-238119.

A method for calculating a point of intersection between curves is disclosed in, for instance, Japanese Patent No. 2734643.

However, processing for approximating rows of dot patterns by curves and calculating points of intersection between the curves by using such a method as disclosed in Japanese Patent No. 2734643 places a higher load than that placed by processing for calculating points of intersection between straight lines, which can make information extraction time consuming.

Approximation of rows of dot patterns is generally performed by using some of the dot patterns that are found to match prepared-for-search dot patterns by template matching. Accordingly, in approximating a row of dot patterns by a curve, as the interval between the thus-found dot patterns increases, the error between the actual row of the dot patterns and an approximated curve disadvantageously increases.

SUMMARY OF THE INVENTION

It is an object of the present invention to at least partially solve the problems in the conventional technology.

According to an aspect of the present invention, there is provided an information extraction apparatus including an obtaining unit that obtains image data pertaining to a printed material, in which information is embedded by additionally printing multiple types of patterns in a matrix, a line-segment-sequence calculating unit that calculates a plurality of substantially-vertical-line-segment sequences, each of which is obtained by connecting patterns arranged in a substantially vertical row in the image data with a polygonal line, and calculates a plurality of substantially-horizontal-line-segment sequences, each of which is obtained by connecting patterns arranged in a substantially horizontal row in the image data with a polygonal line, a search unit that searches, for each combination of one substantially-vertical-line-segment sequence of the substantially-vertical-line-segment sequences and one substantially-horizontal-line-segment sequence of the substantially-horizontal-line-segment sequences, substantially-vertical line segments that form the one substantially-vertical-line-segment sequence and substantially-horizontal line segments that form the one substantially-horizontal-line-segment sequence for a substantially-vertical line segment and a substantially-horizontal line segment that intersect with each other, an intersection-point calculating unit that calculates a point of intersection between the substantially-vertical line segment and the substantially-horizontal line segment having been found by the search unit as a position of a pattern, and an extracting unit that extracts the information embedded in the printed material by identifying types of patterns at positions calculated by the intersection-point calculating unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an explanatory diagram of an example of a method for making intersection determination of a substantially-vertical line segment and a substantially-horizontal line segment;

FIG. 6 is a schematic diagram illustrating example criteria for determining whether a substantially-vertical line segment and a substantially-horizontal line segment intersect with each other;

FIG. 13 is a block diagram illustrating an example of the configuration of an information extraction system that includes a server as a modification.

DETAILED DESCRIPTION OF THE PREFERRED EMBODIMENTS

Exemplary embodiments of an information extraction apparatus, an information extraction method, an information-extraction computer program product, and a storage medium according to the present invention are described in detail below with reference to the accompanying drawings. In the following embodiments, examples in each of which an information extraction apparatus is a multifunction printer (MFP) that has, of a copier function, a printer function, a scanner function, and a facsimile function, at least the scanner function and the printer function will be described.

In a first embodiment according to the present invention, an example of sequentially searching substantially-vertical line segments that form a substantially-vertical-line-segment sequence, which approximates a row of dot patterns, and substantially-horizontal line segments that form a substantially-horizontal-line-segment sequence, which approximates a row of dot patterns, for a substantially-vertical line segment and a substantially-horizontal line segment to be subjected to determination (hereinafter, "intersection determination") as to whether the substantially-vertical line segment and the substantially-horizontal line segment intersect with each other, thereby finding a substantially-vertical line segment and a substantially-horizontal line segment that intersect with each other will be discussed.

The configuration of an MFP 1 according to the first embodiment will be described below.

Figure 1:
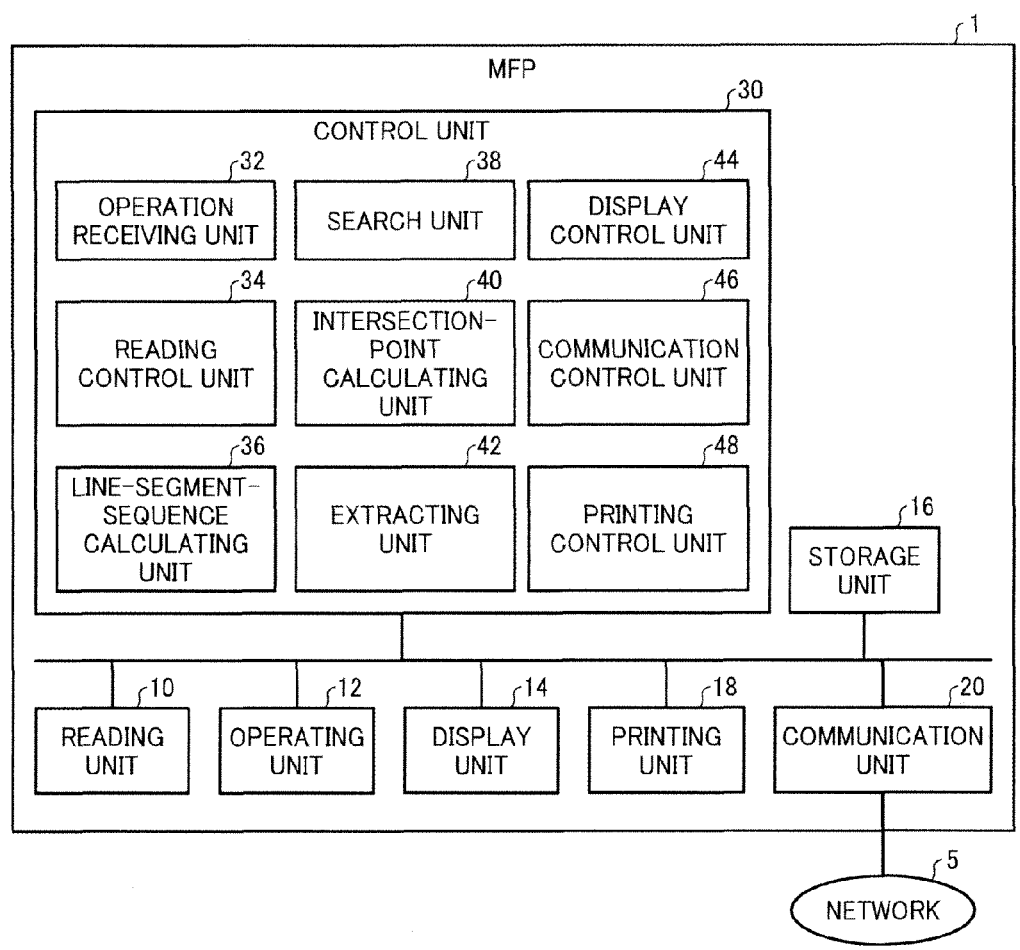
FIG. 1 is a block diagram illustrating an example configuration of an MFP according to a first embodiment of the present invention.

FIG. 1 is a block diagram illustrating an example configuration of the MFP 1 according to the first embodiment. As illustrated in FIG. 1, the MFP 1 includes a reading unit 10, an operating unit 12, a display unit 14, a storage unit 16, a printing unit 18, a communication unit 20, and a control unit 30.

The reading unit 10 reads a printed material to obtain image data. An existing reading device, such as a scanner, can be used as the reading unit 10. Particularly, in the first embodiment, the reading unit 10 obtains image data by reading a printed material, in which information is embedded by additionally printing multiple types of dot patterns in a matrix. In the first embodiment, an example where dot patterns are used as patterns for use in information embedding; however, the patterns are not limited thereto, and other patterns can be used to embed information.

Figure 2:
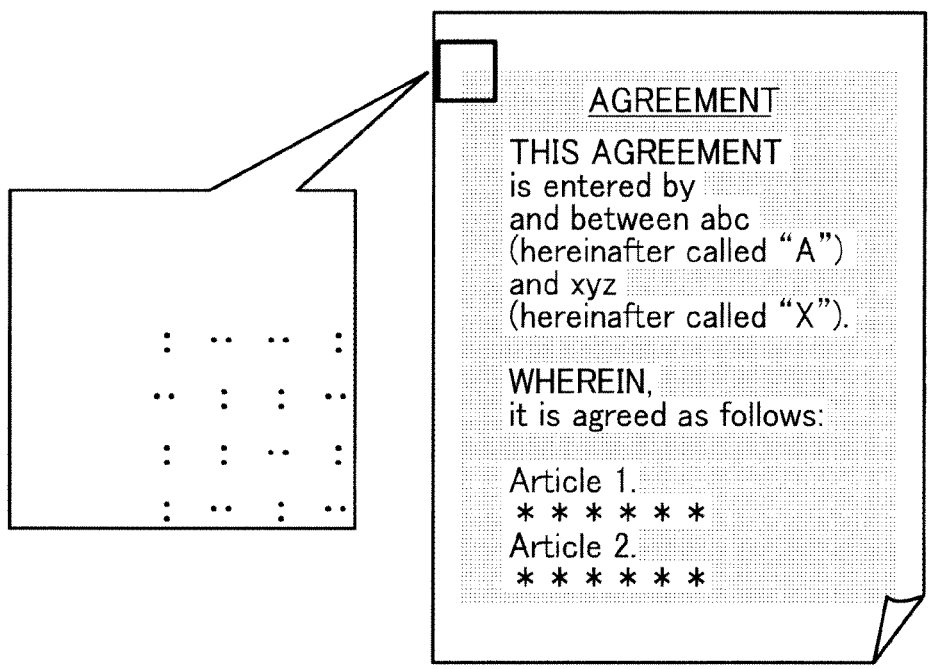
FIG. 2 is a schematic diagram illustrating an example of a printed material, in which information is embedded by additionally printing multiple types of dot patterns in a matrix.

FIG. 2 is a schematic diagram illustrating an example of a printed material, in which information is embedded by additionally printing multiple types of dot patterns in a matrix. In the example illustrated in FIG. 2, together with a document image, two types of dot patterns (":" and "• •") that represent bit 0 and bit 1 are printed in the background of the document image; that is, additional information is embedded in the document image. Examples of information to be embedded in a printed material include information for use in providing security or protecting contents of the printed material and information for providing a link to an image data being a print source or to a Web page.

Referring back to FIG. 1, the operating unit 12 is provided to make inputs for various operations, such as reading operation that instructs to read a printed material. An existing input device, such as a key switch and/or a touch panel, can be used as the operating unit 12.

The display unit 14 displays a menu image for use in performing various operations, such as the reading operation, a status of progress and/or a result of operation performed by the MFP 1, and the like. An existing display device, such as a touch panel display or a liquid crystal display, can be used as the display unit 14. The operating unit 12 and the display unit 14 can be integrally configured as a touch panel display or the like.

The storage unit 16 stores various computer programs to be executed by the MFP 1, various information pieces to be used in various operations performed by the MFP 1, and the like. An existing storage device, such as a hard disk drive (HDD), a solid state drive (SSD), a memory card, an optical disk, a read only memory (ROM), or a random access memory (RAM), that is capable of magnetically, optically, or electrically storing information can be used as the storage unit 16.

The printing unit 18 prints image data, such as a document image, on recording paper, such as transfer paper. An existing printer, can be used as the printing unit 18.

The communication unit 20 carries out communications via a network 5 with an external equipment (not shown), such as a personal computer (PC). An existing communication device, can be used as the communication unit 20. The network 5 can be any network irrespective of whether the network is wired or wireless, or a local area network (LAN) or a public switched network.

The control unit 30 controls various units of the MFP 1. A central processing unit (CPU) or the like can be used as the control unit 30. The control unit 30 includes an operation receiving unit 32, a reading control unit 34, a line-segment-sequence calculating unit 36, a search unit 38, an intersection-point calculating unit 40, an extracting unit 42, a display control unit 44, a communication control unit 46, and a printing control unit 48.

The operation receiving unit 32 receives inputs for various operations, such as reading operation, entered from the operating unit 12.

When an input for reading operation is received by the operation receiving unit 32, the reading control unit 34 (an example obtaining unit) controls the reading unit 10 to read a printed material to obtain image data as image data. Particularly in the first embodiment, the reading control unit 34 controls the reading unit 10 such that the reading unit 10 reads a printed material (see, for instance, FIG. 2), in which information is embedded by additionally printing multiple types of dot patterns in a matrix, thereby obtaining image data.

The line-segment-sequence calculating unit 36 calculates a plurality of substantially-vertical-line-segment sequences, each of which is obtained by connecting, with a polygonal line, substantially-vertically arranged dot patterns in the image data obtained by the reading control unit 34, and calculates a plurality of substantially horizontal-line-segment sequences, each of which is obtained by connecting, with a polygonal line, substantially-horizontally arranged dot patterns in the image data.

Specifically, the line-segment-sequence calculating unit 36 identifies some of substantially-vertically arranged dot patterns in the image data obtained by the reading control unit 34 by template matching, and calculates substantially-vertical-line-segment sequences from rows of the thus-identified dot patterns. Similarly, the line-segment-sequence calculating unit 36 identifies some of substantially-horizontally arranged dot patterns in the image data obtained by the reading control unit 34 by template matching, and calculates substantially-horizontal-line-segment sequences from rows of the thus-identified dot patterns.

Meanwhile, the substantially-vertical-line-segment sequences are line segment sequences, each of which is obtained by connecting a row of dot patterns with a polygonal line in an order of coordinate values that define vertical positions. The substantially-horizontal-line-segment sequences are line segment sequences, each of which is obtained by connecting a row of dot patterns with a polygonal line in an order of coordinate values that define horizontal positions. Alternatively, each of the substantially-vertical-line-segment sequences and the substantially-horizontal-line-segment sequences can have a half line at its end in place of a line segment.

Figure 3:
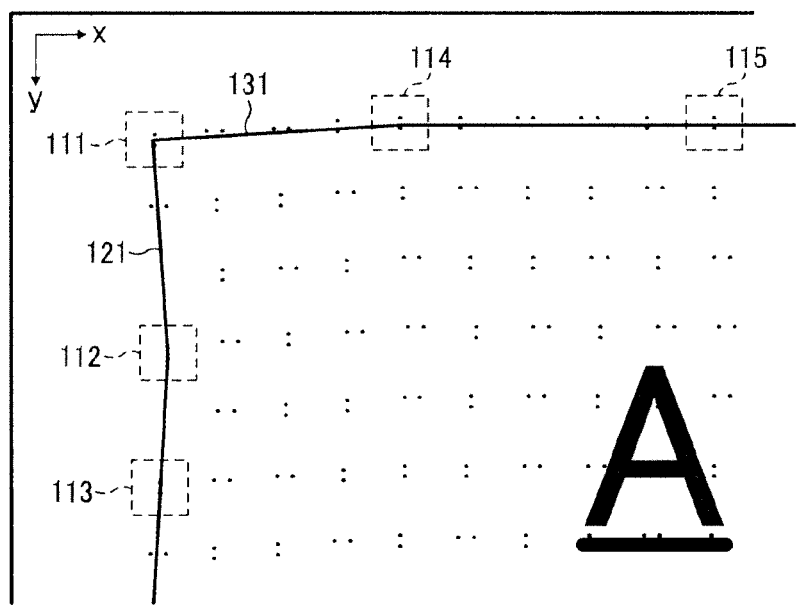
FIG. 3 is an explanatory diagram of an example of a method for calculating a substantially-vertical-line-segment sequence and a substantially-horizontal-line-segment sequence.
Figure 4:
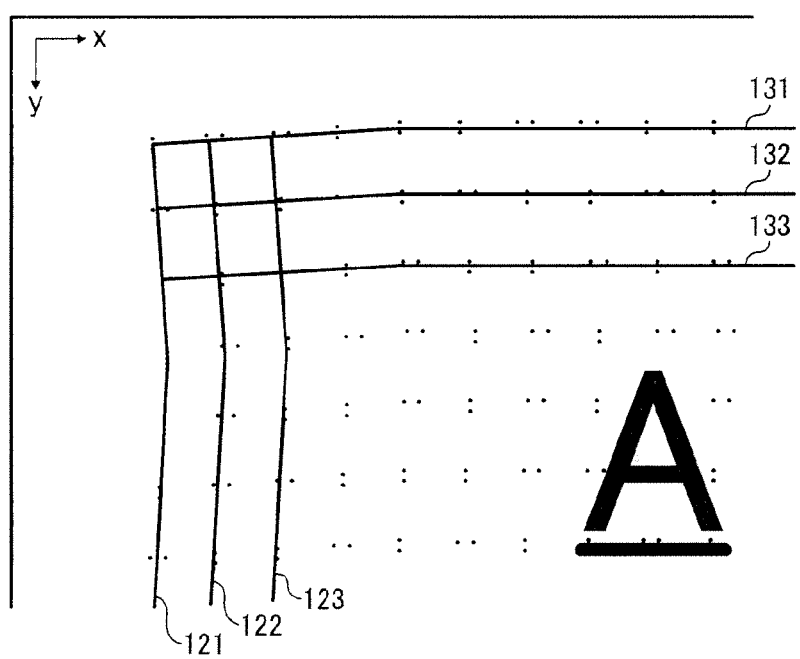
FIG. 4 is an explanatory diagram of an example of a method for calculating substantially-vertical-line-segment sequences and substantially-horizontal-line-segment sequences.

FIG. 3 is an explanatory diagram illustrating an example method for calculating a substantially-vertical-line-segment sequence and a substantially-vertical-line-segment sequence. FIG. 4 is an explanatory diagram illustrating an example method for calculating substantially-vertical-line-segment sequences and substantially-horizontal-line-segment sequences. In each of FIG. 3 and FIG. 4, image data pertaining to the printed material illustrated in FIG. 2 obtained by the reading control unit 34 is depicted.

In the example illustrated in FIG. 3, the line-segment-sequence calculating unit 36 has calculated a substantially-vertical-line-segment sequence 121 by identifying substantially-vertically arranged dot patterns 111, 112, 113, ... in the image data by template matching and connecting centers of the thus-identified dot patterns in the increasing order of their Y coordinates (in the order of dot patterns 111, 112, 113, ... ) with a polygonal line. Similarly, the line-segment-sequence calculating unit 36 has calculated a substantially-horizontal-line-segment sequence 131 by identifying substantially-horizontally arranged dot patterns 111, 114, 115, ... in the image data by template matching and connecting centers of the thus-identified dot patterns in the increasing order of their X coordinates (in the order of dot patterns 111, 114, 115, ... ) with a polygonal line.

In the first embodiment, as illustrated in FIG. 3, line segment sequences to be calculated by the line-segment-sequence calculating unit 36 are substantially-vertical-line-segment sequences and substantially-horizontal-line-segment sequences so as to allow for distortion that can be mechanically caused by the reading unit 10. Alternatively, the substantially-vertical-line-segment sequences and the substantially-horizontal-line-segment sequences can be vertical-line-segment sequences and horizontal-line-segment sequences, respectively. Put another way, substantially-vertical-line-segment sequences and the substantially-horizontal-line-segment sequences to be calculated by the line-segment-sequence calculating unit 36 include vertical-line-segment sequences and horizontal-line-segment sequences, respectively.

By performing the operations discussed above, the line-segment-sequence calculating unit 36 calculates a plurality of substantially-vertical-line-segment sequences 121, 122, 123, ... that approximate substantially vertical rows of dot patterns arranged in a matrix and a plurality of substantially-horizontal-line-segment sequences 131, 132, 133, ... that approximate substantially horizontal rows of the dot patterns as illustrated in FIG. 4.

When substantially-vertical rows of dot patterns identified by template matching are designated by $P_m$ (m=1, ..., M), a substantially-vertical-line-segment sequence $S_P$ can be expressed by Equation (1) below (M≧3). When substantially-horizontal rows of the dot patterns identified by template matching are designated by $Q_n$ (n=1, ..., N), a substantially-horizontal-line-segment sequence $S_Q$ can be expressed by Equation (2) below (N≧3).

$$S_P = \{P_m P_{m+1}\}_{m=1}^{M-1} \quad (1)$$

$$S_Q = \{Q_n Q_{n+1}\}_{n=1}^{N-1} \quad (2)$$

Referring back to FIG. 1, the search unit 38 searches, for each combination of one substantially-vertical-line-segment sequence of the substantially-vertical-line-segment sequences and one substantially-horizontal-line-segment sequence of the substantially-horizontal-line-segment sequences calculated by the line-segment-sequence calculating unit 36, substantially-vertical line segments that form the one substantially-vertical-line-segment sequence and substantially-horizontal line segments that form the one substantially-horizontal-line-segment sequence for a substantially-vertical line segment and a substantially-horizontal line segment that intersect with each other.

Specifically, the search unit 38 selects a substantially-vertical line segment and a substantially-horizontal line segment to be subjected to intersection determination from among the substantially-vertical line segments that form the substantially-vertical-line-segment sequence and the substantially-horizontal line segments that form the substantially-horizontal-line-segment sequence, calculates a point of intersection between the selected substantially-vertical line segment or an extension thereof and the selected substantially-horizontal line segment or an extension thereof by using values of parameters, and determines whether the substantially-vertical line segment and the substantially-horizontal line segment intersect with each other based on the values of the parameters.

Figure 7:
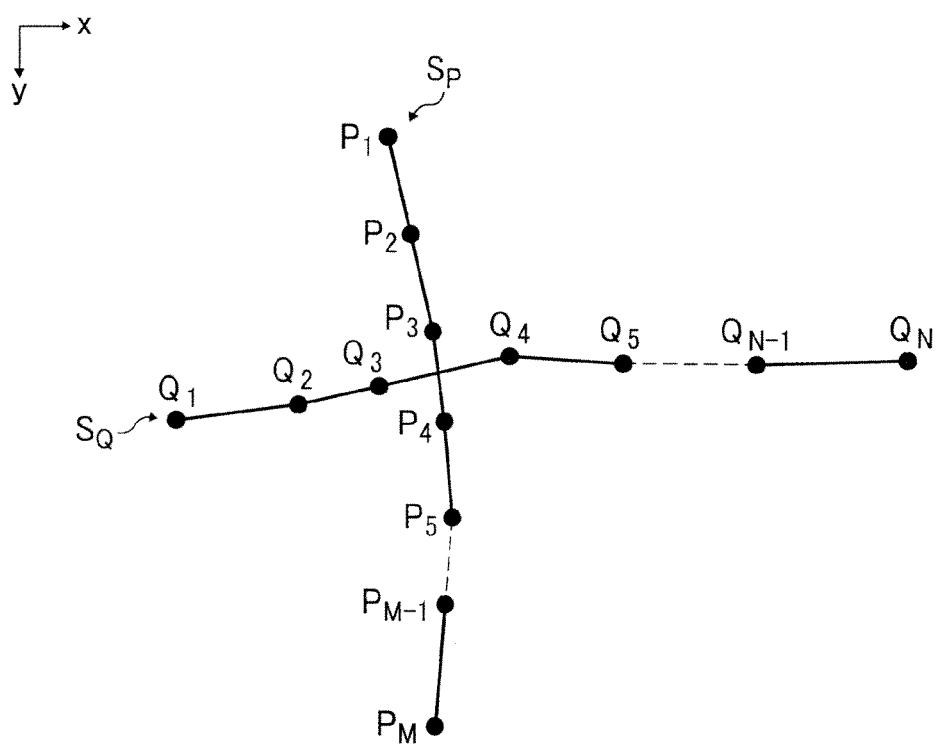
FIG. 7 is a schematic explanatory diagram illustrating an example of a method for selecting a substantially-vertical line segment and a substantially-horizontal line segment to be subjected to intersection determination.

FIG. 5 is a schematic explanatory diagram illustrating an example of a method for making intersection determination of a substantially-vertical line segment and a substantially-horizontal line segment. FIG. 6 is a schematic diagram illustrating example criteria for determining whether a substantially-vertical line segment and a substantially-horizontal line segment intersect with each other. FIG. 7 is a schematic explanatory diagram illustrating an example of a method for selecting a substantially-vertical line segment and a substantially-horizontal line segment to be subjected to intersection determination.

As illustrated in FIG. 5, when determining whether a substantially-vertical line segment $P_i P_{i+1}$ (1≦i≦M−1) contained in the substantially-vertical-line-segment sequence $S_P$ and a substantially-horizontal line segment $Q_jQ_{j+1}$ ($1 \leq N \leq 1$) contained in the substantially-horizontal-line-segment sequence $S_Q$ intersect with each other, the search unit 38 calculates a point P' on the substantially-vertical line segment $P_iP_{i+1}$ and a point Q' on the substantially-horizontal line segment $Q_jQ_{j+1}$ by using a value of a parameter s and a value of a parameter t, respectively. A value of the point P' and a value of the point Q' can be expressed by Equation (3) and Equation (4), respectively.

$$P' = P_i + s(P_{i+1} - P_i) \tag{3}$$

$$Q' = Q_j + t(Q_{j+1} - Q_j) \tag{4}$$

The search unit 38 further calculates values of the parameters s and t, with which the value of the point P' and the value of the point Q' (x coordinates and y coordinates) are equal to each other, and determines whether the substantially-vertical line segment $P_iP_{i+1}$ and the substantially-horizontal line segment $Q_jQ_{j+1}$ intersect with each other by using the thus-calculated values of the parameters s and t. A value of the parameter s and a value of and the parameter t can be expressed by Equation (5) and Equation (6), respectively.

$$s = \frac{(y_{Q_{j+1}} - y_{Q_j})(x_{Q_j} - x_{P_i}) - (x_{Q_{j+1}} - x_{Q_j})(y_{Q_j} - y_{P_i})}{(x_{P_{i+1}} - x_{P_i})(y_{Q_{j+1}} - y_{Q_j}) - (y_{P_{i+1}} - y_{P_i})(x_{Q_{j+1}} - x_{Q_j})} \tag{5}$$

$$t = \frac{(y_{P_{i+1}} - y_{P_i})(x_{Q_j} - x_{P_i}) - (x_{P_{i+1}} - x_{P_i})(y_{Q_j} - y_{P_i})}{(x_{P_{i+1}} - x_{P_i})(y_{Q_{j+1}} - y_{Q_j}) - (y_{P_{i+1}} - y_{P_i})(x_{Q_{j+1}} - x_{Q_j})} \tag{6}$$

As given in FIG. 6, when each of the values of the parameters s and t satisfies both a condition of being equal to or greater than 0 and a condition of being equal to or less than 1, the search unit 38 determines that the substantially-vertical line segment $P_iP_{i+1}$ and the substantially-horizontal line segment $Q_jQ_{j+1}$ intersect with other; in other cases, the search unit 38 determines that the substantially-vertical line segment $P_iP_{i+1}$ and the substantially-horizontal line segment $Q_jQ_{j+1}$ do not intersect with other.

Accordingly, in the example illustrated in FIG. 7, intersection determination of a substantially-vertical line segment $P_3P_4$ and a substantially-horizontal line segment $Q_3Q_4$ is made such that, when each of the values of the parameters s and t satisfies both the condition of being equal to or greater than 0 and the condition of being equal to or less than 1, the substantially-vertical line segment $P_3P_4$ and the substantially-horizontal line segment $Q_3Q_4$ are determined to intersect with each other, by which search is completed.

In contrast, when it is determined that a substantially-vertical line segment and a substantially-horizontal line segment do not intersect with each other based on values of the parameters, the search unit 38 selects a substantially-vertical line segment and a substantially-horizontal line segment to be subjected to intersection determination next based on the values of the parameters.

Specifically, when it is found that a value of the parameter s is less than 0 as a result of intersection determination of a substantially-vertical line segment $P_iP_{i+1}$ and a substantially-horizontal line segment $Q_jQ_{j+1}$, the point P' is on a half line extending from $P_i$ of the substantially-vertical line segment $P_iP_{i+1}$ as given in FIG. 6. Accordingly, the search unit 38 selects one of substantially-vertical line segments $P_1P_2$ to $P_{i-1}P_i$ the substantially-vertical-line-segment sequence $S_P$.

When it is found that a value of the parameter s is greater than 1, the point P' is on a half line extending from $P_{i+1}$ of the substantially-vertical line segment $P_iP_{i+1}$ as given in FIG. 6. Accordingly, the search unit 38 selects one of substantially-vertical line segments $P_{i+1}P_{i+2}$ to $P_{M-1}P_M$ of the substantially-vertical-line-segment sequence $S_P$.

When it is found that a value of the parameter t is less than 0, the point Q' is on a half line extending from $Q_j$ of the substantially-horizontal line segment $Q_jQ_{j+1}$ as given in FIG. 6. Accordingly, the search unit 38 selects one of substantially-horizontal line segments $Q_1Q_2$ to $Q_{j-1}Q_j$ of the substantially-horizontal-line-segment sequence $S_Q$.

When it is found that a value of the parameter t is greater than 1, the point Q' is on a half line extending from $Q_{j+1}$ of the substantially-horizontal line segment $Q_jQ_{j+1}$ as given in FIG. 6. Accordingly, the search unit 38 selects one of substantially-horizontal line segments $Q_{j+1}Q_{j+2}$ to $Q_{N-1}Q_N$ of the substantially-horizontal-line-segment sequence $S_Q$.

Particularly in the first embodiment, the search unit 38 selects, based on values of the parameters, a substantially-vertical line segment and a substantially-horizontal line segment to be subjected to intersection determination next from among substantially-vertical line segments connected to a substantially-vertical line segment determined to be not intersecting and from among substantially-horizontal line segments connected to a substantially-horizontal line segment determined to be not intersecting.

Accordingly, when the value of the parameter s is less than 0, the search unit 38 selects substantially-vertical line segments $P_{i-1}P_i$ from the substantially-vertical-line-segment sequence Sp; in contrast, when the value of the parameter s is greater than 1, the search unit 38 selects substantially-vertical line segments $P_{i+1}P_{i+2}$ from the substantially-vertical-line-segment sequence Sp. Similarly, when the value of the parameter t is less than 0, the search unit 38 selects substantially-horizontal line segments from the substantially-horizontal-line-segment sequence $S_Q$; in contrast, when the value of the parameter t is greater than 1, the search unit 38 selects substantially-horizontal line segments $Q_{j+1}Q_{j+2}$ from the substantially-horizontal-line-segment sequence $S_Q$.

For instance, because each of the values of the parameters s and t obtained by making intersection determination of a substantially-vertical line segment $P_4P_5$ and a substantially-horizontal line segment $Q_4Q_5$ illustrated in FIG. 7 is less than 0, the search unit 38 selects the substantially-vertical line segments $P_3P_4$ and the substantially-horizontal line segments $Q_3Q_4$ from the substantially-vertical-line-segment sequence $S_P$ and the substantially-horizontal-line-segment sequence $S_Q$, respectively. For instance, because each of the values of the parameters s and t obtained by making intersection determination of a substantially-vertical line segment $P_2P_3$ and a substantially-horizontal line segment $Q_2Q_3$ illustrated in FIG. 7 is greater than 1, the search unit 38 selects the substantially-vertical line segments $P_3P_4$ and the substantially-horizontal line segments $Q_3Q_4$ from the substantially-vertical-line-segment sequence $S_P$ and the substantially-horizontal-line-segment sequence $S_Q$, respectively.

In the first embodiment, the search unit 38 selects, as a substantially-vertical line segment and a substantially-horizontal line segment to be subjected to intersection determination first, a substantially-vertical line segment that is positioned at a substantial center of a substantially-vertical-line-segment sequence and a substantially-horizontal line segment that is positioned at a substantial center of a substantially-horizontal-line-segment sequence.

Specifically, the search unit 38 selects a substantially-vertical line segment $P_{M/2}P_{(M/2)+1}$ from the substantially-vertical-line-segment sequence $S_P$ and a substantially-horizontal line segment $Q_{N/2}Q_{(N/2)+1}$ from the substantially-horizontal-line-segment sequence $S_Q$ first and makes intersection determination thereof. Fractions of M/2 and N/2 can be either rounded up or down.

By performing the operations discussed above, the search unit 38 searches for a substantially-vertical line segment and a substantially-horizontal line segment that intersect with each other for each combination of one of the substantially-vertical-line-segment sequences and one of the substantially-horizontal-line-segment sequences calculated by the line-segment-sequence calculating unit 36.

Referring back to FIG. 1, the intersection-point calculating unit 40 calculates a point of intersection between the substantially-vertical line segment and the substantially-horizontal line segment found by the search unit 38 as a position of a dot pattern. Specifically, when a substantially-vertical line segment and a substantially-horizontal line segment are determined to intersect with each other by the search unit 38, the intersection-point calculating unit 40 substitutes values of the parameters s and t used in the determination into Equation (5) or (6) to calculate coordinates of the intersection point between the substantially-vertical line segment and the substantially-horizontal line segment.

The extracting unit 42 identifies types of dot patterns at positions calculated by the intersection-point calculating unit 40 and extracts the information embedded in the printed material. Specifically, the extracting unit 42 identifies a type of a dot pattern for each of the positions calculated by the intersection-point calculating unit 40 by template matching, thereby extracting the information embedded in the printed material.

Thereafter, the control unit 30 performs processing by using the information extracted by the extracting unit 42. For instance, when the information extracted by the extracting unit 42 is information for use in providing security or protecting contents of the printed material, alteration detection by using authentication information stored in the storage unit 16 or the like is performed.

The display control unit 44 causes the menu image for use in performing various operations, such as reading operation, a status of progress and/or a result of operation performed by the MFP 1, and the like to be displayed on the display unit 14. For instance, the display control unit 44 causes a status of progress of information extraction, a result of information extraction, a result of alteration detection, and the like to be displayed on the display unit 14.

The communication control unit 46 instructs the communication unit 20 to transmit information to an external equipment (not shown) and causes the communication unit 20 to receive information transmitted from the external equipment. For instance, the communication control unit 46 causes the communication unit 20 to receive image data that is transmitted from the external equipment and that has multiple types of dot patterns arranged in a matrix in its background.

The printing control unit 48 controls the printing unit 18 to print image data, such as a document image, on recording paper, such as transfer paper. For instance, when image data has been received by the communication unit 20, the printing control unit 48 controls the printing unit 18 to print the thus-received image data on recording paper.

Note that the MFP 1 is not necessarily configured to include all the units discussed above and can be configured not to include some of the units.

Operations performed by the MFP according to the first embodiment will be described below.

Figure 8:
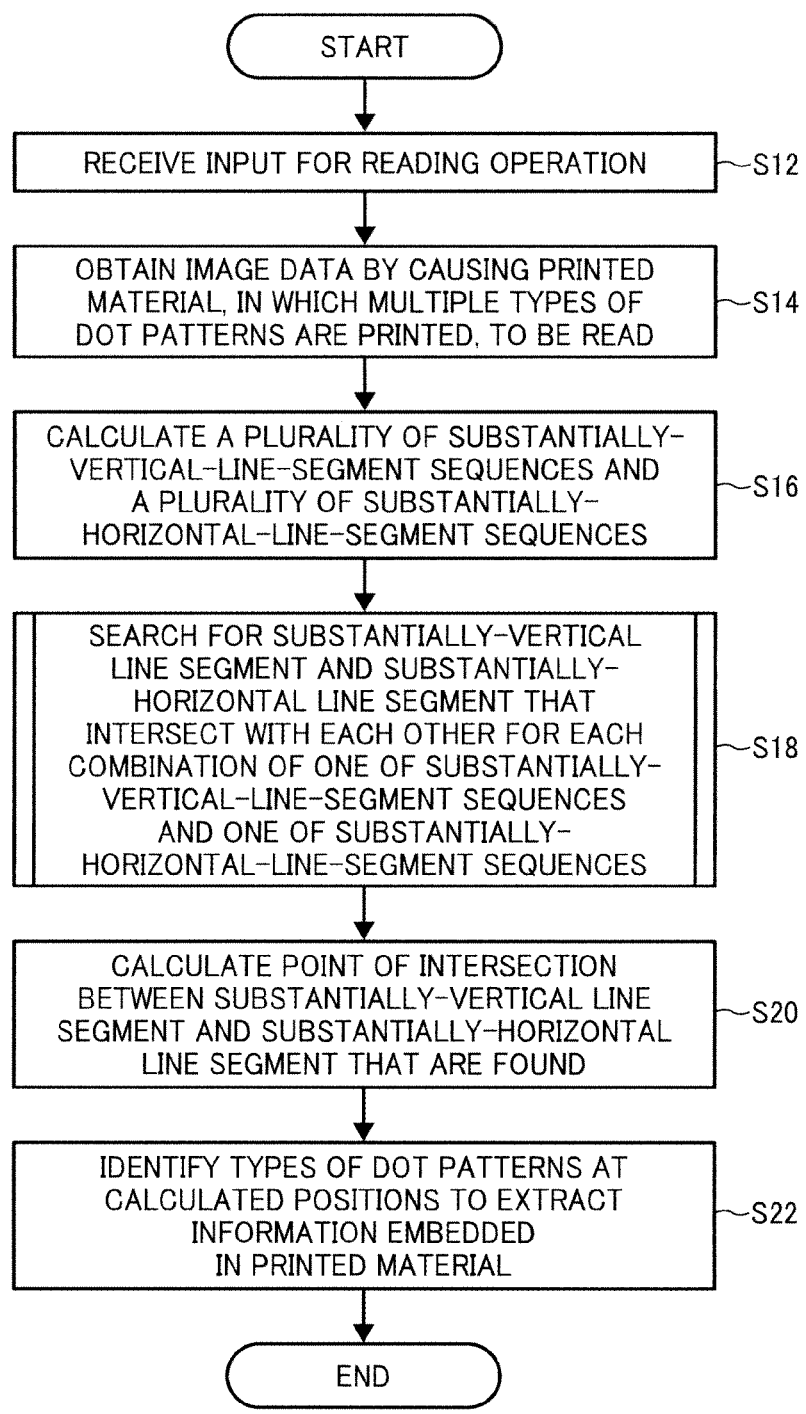
FIG. 8 is a flowchart illustrating an example of a process procedure to be performed by the MFP according to the first embodiment.

FIG. 8 is a flowchart illustrating an example of a process procedure to be performed by the MFP 1 according to the first embodiment.

The operation receiving unit 32 receives an input for reading operation entered from the operating unit 12 (Step S12).

Subsequently, when the input for reading operation has been received by the operation receiving unit 32, the reading control unit 34 controls the reading unit 10 10 to read a printed material, in which information is embedded by printing thereon multiple types of dot patterns in a matrix, thereby obtaining image data (Step S14).

Subsequently, the line-segment-sequence calculating unit 36 calculates a plurality of substantially-vertical-line-segment sequences, each of which is obtained by connecting dot patterns arranged in a substantially vertical row in the image data obtained by the reading control unit 34 with a polygonal line, and calculates a plurality of substantially-horizontal-line-segment sequences, each of which is obtained by connecting dot patterns arranged in a substantially horizontal row in the image data with a polygonal line (Step S16).

Subsequently, the search unit 38 performs a searching operation of searching, for each combination of one substantially-vertical-line-segment sequence of the substantially-vertical-line-segment sequences and one substantially-horizontal-line-segment sequence of the substantially-horizontal-line-segment sequences calculated by the line-segment-sequence calculating unit 36, substantially-vertical line segments that form the one substantially-vertical-line-segment sequence and substantially-horizontal line segments that form the one substantially-horizontal-line-segment sequence for a substantially-vertical line segment and a substantially-horizontal line segment that intersect with each other (Step S18). The searching operation will be described in detail later.

Subsequently, the intersection-point calculating unit 40 calculates a point of intersection between the substantially-vertical line segment and the substantially-horizontal line segment found by the search unit 38 as a position of a dot pattern (Step S20).

Subsequently, the extracting unit 42 identifies types of dot patterns at positions calculated by the intersection-point calculating unit 40 to extract the information embedded in the printed material (Step S22).

Figure 9:
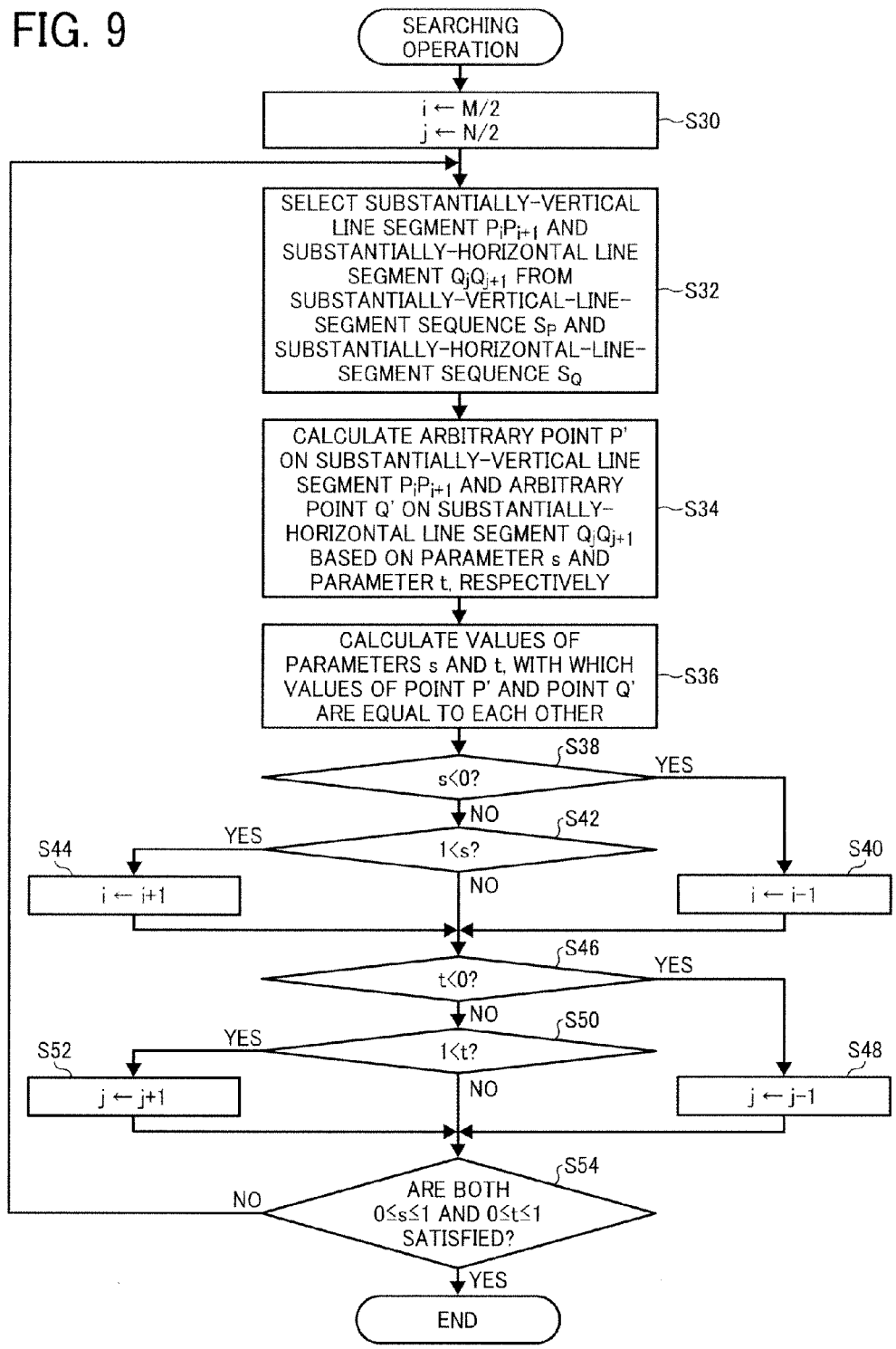
FIG. 9 is a flowchart illustrating an example of a procedure for a searching operation to be performed by the MFP according to the first embodiment.

FIG. 9 is a flowchart illustrating an example of a process procedure for the searching operation illustrated as Step S18 in FIG. 8.

The search unit 38 initializes a value of a variable to M/2 and a value of a variable j to N/2 (Step S30).

Subsequently, the search unit 38 selects a substantially-vertical line segment $P_iP_{i+1}$ from the substantially-vertical-line-segment sequence $S_P$ and a substantially-horizontal line segment $Q_jQ_{j+1}$ from the substantially-horizontal-line-segment sequence $S_Q$ (Step S32).

Subsequently, the search unit 38 calculates a point P', on the substantially-vertical line segment $P_iP_{i+1}$ based on a value of the parameter s and a point Q' on the substantially-horizontal line segment $Q_jQ_{j+1}$ based on a value of the parameter t (Step S34).

Subsequently, the search unit 38 calculates values of the parameters s and t, with which the value of the point P' and the value of the point Q' are equal to each other (Step S36).

Subsequently, the search unit 38 determines whether the value of the parameter s is less than 0 (Step S38). If the value of the parameter s is less than 0 (Yes at Step S38), the search unit 38 decrements the value of the variable i (Step S40).

In contrast, if the value of the parameter s is not less than 0 (No at Step S38), the search unit 38 further determines whether the value of the parameter s is greater than 1 (Step S42). If the value of the parameter s is greater than 1 (Yes at Step S42), the search unit 38 increments the value of the variable i (Step S44).

If the value of the parameter s is neither less than 0 (No at Step S38) nor greater than 1 (No at Step S42), the value of the variable i remains unchanged.

Subsequently, the search unit 38 determines whether the value of the parameter t is less than 0 (Step S46). If the value of the parameter t is less than 0 (Yes at Step S46), the search unit 38 decrements the value of the variable j (Step S48).

In contrast, if the value of the parameter t is not less than 0 (No at Step S46), the search unit 38 further determines whether the value of the parameter t is greater than 1 (Step S50). If the value of the parameter t is greater than 1 (Yes at Step S50), the search unit 38 increments the value of the variable j (Step S52).

If the value of the parameter t is neither less than 0 (No at Step S46) nor greater than 1 (No at Step S50), the value of the variable j remains unchanged.

Subsequently, the search unit 38 determines whether each of the values of the parameters s and t satisfies both a condition of being equal to or greater than 0 and a condition of being equal to or less than 1 (Step S54). If each of the values of the parameters s and t satisfies both the condition of being equal to or greater than 0 and the condition of being equal to or less than 1 (Yes at Step S54), the search unit 38 determines that the substantially-vertical line segment $P_iP_{i+1}$ and the substantially-horizontal line segment $Q_jQ_{j+1}$ intersect with each other, by which the searching operation is completed.

In contrast, if each of the value of the parameters s and t does not satisfy both the condition of being equal to or greater than 0 and the condition of being equal to or less than 0 (No at Step S54), control returns to Step S32, where the search unit 38 searches for another substantially-vertical line segment $P_iP_{i+1}$ and another substantially-horizontal line segment $Q_jQ_{j+1}$.

As discussed above, according to the first embodiment, because rows of dot patterns are approximated by substantially-vertical-line-segment sequences and substantially-horizontal-line-segment sequences, errors of the approximated line segment sequences with respect to rows of the actual dot patterns can be reduced. This allows accurate determination of positions of individual dot patterns for extraction of embedded information even when the rows of the dot patterns are distorted.

Particularly according to the first embodiment, a substantially-vertical line segment and a substantially-horizontal line segment to be subjected to intersection determination are selected from among substantially-vertical line segments that form a substantially-vertical-line-segment sequence and from among substantially-horizontal line segments that form a substantially-horizontal-line-segment sequence, respectively. This allows calculation of intersection points by repeating calculation of an intersection point between straight lines, thereby lightening load placed by processing. This allows easy determination of positions of individual dot patterns for extraction of embedded information even when the rows of the dot patterns are distorted.

According to the first embodiment, a substantially-vertical line segment positioned at a substantial center of a substantially-vertical-line-segment sequence and a substantially-horizontal line segment positioned at a substantial center of a substantially-horizontal-line-segment sequence are subjected to intersection determination first. If they are determined not to be intersecting, a substantially-vertical line segment and a substantially-horizontal line segment to be subjected to intersection determination next are selected from among substantially-vertical line segments connected to the substantially-vertical line segment determined to be not intersecting and from among substantially-horizontal line segments connected to the substantially-horizontal line segment determined to be not intersecting based on values of parameters. Hence, according to the first embodiment, it is allowed to sequentially search for a substantially-vertical line segment and a substantially-horizontal line segment that can intersect with each other, thereby reducing the number of search times to be equal to or less than M/2 or N/2, which leads to an increase in search efficiency.

In a second embodiment of the present invention, an example of further increasing search efficiency in search for a substantially-vertical line segment and a substantially-horizontal line segment that intersect with each other as compared to that of the first embodiment will be described. What makes the second embodiment different from the first embodiment will be primarily described below, and constituent elements that have similar functions to those of the first embodiment are denoted by like names and/or reference numerals and their repeated descriptions are omitted.

The configuration of an MFP 201 according to the second embodiment will be described below.

Figure 10:
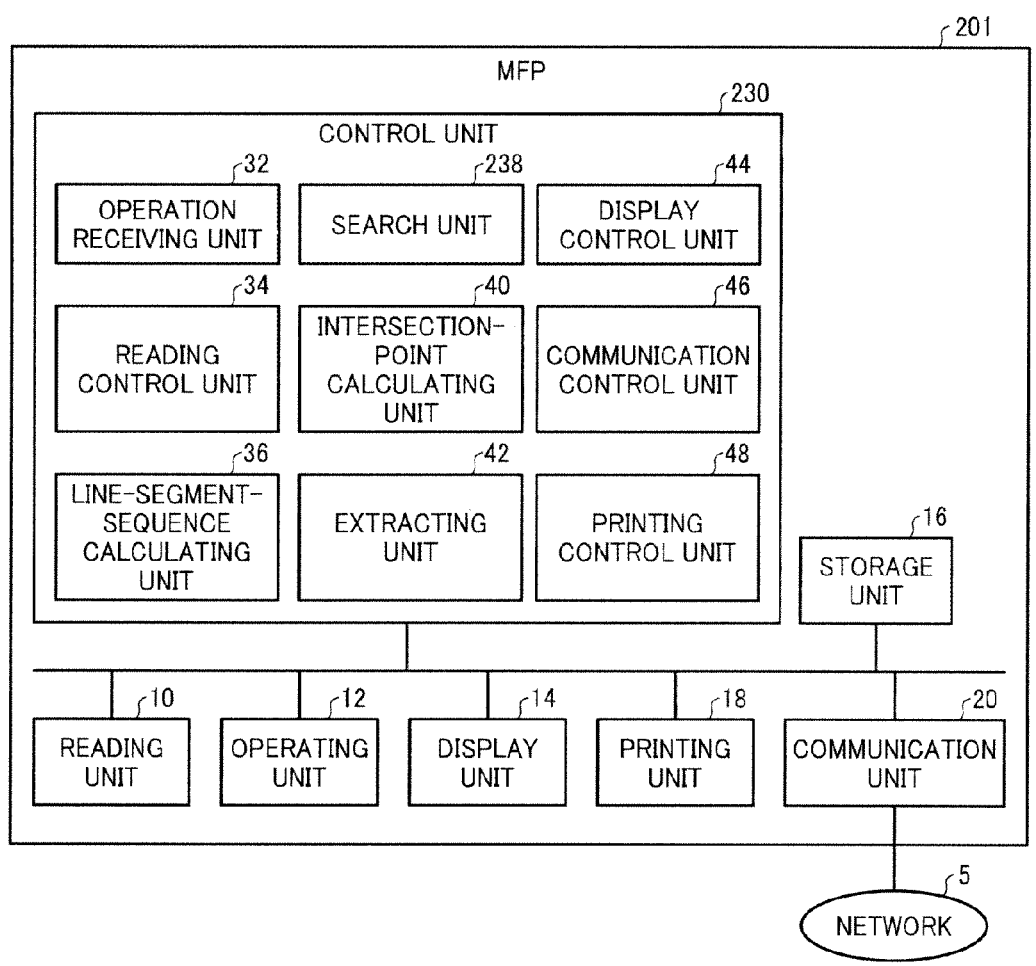
FIG. 10 is a block diagram illustrating an example configuration of an MFP according to a second embodiment of the present invention.

FIG. 10 is a block diagram illustrating an example configuration of the MFP 201 according to the second embodiment. The configuration of the MFP 201 is similar to the configuration of the MFP 1 except for a search unit 238 of a control unit 230. Accordingly, the configuration of the search unit 238 that mainly makes the second embodiment to differ from the first embodiment will be described below.

The search unit 238 defines a substantially-vertical-line-segment partial sequence as a portion of a substantially-vertical-line-segment sequence that can intersect with a substantially-horizontal line segment, and defines a substantially-horizontal-line-segment partial sequence as a portion of a substantially-horizontal-line-segment sequence that can intersect with a substantially-vertical line segment. A substantially-vertical-line-segment partial sequence $S'_P$ and a substantially-horizontal-line-segment partial sequence $S'_Q$ to be defined by the search unit 238 are expressed by Equation (7) ($1 \leq Ps \leq M-2$, $2 \leq Pe \leq M-1$) and Equation (8) ($1 \leq Qs \leq N-2$, $2 \leq Qe \leq N-1$), respectively.

$$S'_P = \{P_m P_{m+1}\}_{m=Ps}^{Pe} \quad (7)$$

$$S'_Q = \{Q_n Q_{n+1}\}_{n=Qs}^{Qe} \quad (8)$$

Subsequently, the search unit 238 selects a substantially-vertical line segment $P_iP_{i+1}$ ($Ps \leq i \leq Pe$) from among substantially-vertical line segments $P_{Ps}P_{Ps+1}$ to $P_{Pe}P_{Pe+1}$ that form the substantially-vertical-line-segment partial sequence $S'_P$ and a substantially-horizontal line segment $Q_jQ_{j+1}$ ($Qs \leq j \leq Qe$) from among substantially-horizontal line segments $Q_{Qs}Q_{Qs+1}$ to $Q_{Qe}Q_{Qe+1}$ that form the substantially-horizontal-line-segment partial sequence $S'_Q$ and makes intersection determination thereof. Because this operation is similar to that performed in the first embodiment, repeated description is omitted.

If the substantially-vertical line segment $P_iP_{i+1}$ and the substantially-horizontal line segment $Q_jQ_{j+1}$ have been determined to be not intersecting with each other, the search unit 238 defines (re-defines) a substantially-vertical-line-segment partial sequence and a substantially-horizontal-line-segment partial sequence based on the values of the parameters, and selects a substantially-vertical line segment and a substantially-horizontal line segment to be subjected to intersection determination next from the thus-defined substantially-vertical-line-segment partial sequence and the thus-defined substantially-horizontal-line-segment partial sequence.

Specifically, when it is found that a value of the parameter s is less than 0 as a result of intersection determination of the substantially-vertical line segment $P_iP_{i+1}$ and the substantially-horizontal line segment $Q_jQ_{j+1}$, the point P' is on a half line extending from $P_i$ of the substantially-vertical line segment $P_iP_{i+1}$ as given in FIG. 6. Accordingly, the search unit 238 sets a last line segment of the substantially-vertical-line-segment partial sequence $S'_P$ to the substantially-vertical line segment $P_iP_{i+1}$ (Pe=i), and selects a substantially-vertical line segment from among substantially-vertical line segments $P_{Ps}P_{Ps+1}$ to $P_iP_{i+1}$ that form the re-set substantially-vertical-line-segment partial sequence $S'_P$.

If the value of the parameter s is greater than 1, as given in FIG. 6, the point P' is on a half line extending from $P_{i+1}$ of the substantially-vertical line segment $P_iP_{i+1}$. Accordingly, the search unit 238 sets a first line segment of the substantially-vertical-line-segment partial sequence $S'_P$ to the substantially-vertical line segment $P_iP_{i+1}$ (Ps=i), and selects a substantially-vertical line segment from among substantially-vertical line segments $P_{Pi}P_{Pi+1}$ to $P_{Pe}P_{Pe+1}$ that form the re-set substantially-vertical-line-segment partial sequence $S'_P$.

If a value of the parameter t is less than 0, as given in FIG. 6, the point Q' is on a half line extending from $Q_j$ of the substantially-horizontal line segment $Q_jQ_{j+1}$. Accordingly, the search unit 238 sets a last line segment of the substantially-horizontal-line-segment partial sequence $S'_Q$ to the substantially-horizontal line segment $Q_iQ_{i+1}$ (Qe=j), and selects a substantially-horizontal line segment from among substantially-horizontal line segments $Q_{Qs}Q_{Qs+1}$ to $Q_jQ_{j+1}$ that form the re-set substantially-horizontal-line-segment partial sequence $S'_Q$.

If the value of the parameter t is greater than 1, as given in FIG. 6, the point Q' is on a half line extending from $Q_{j+1}$ of the substantially-horizontal line segment $Q_jQ_{j+1}$. Accordingly, the search unit 238 sets a first line segment of the substantially-horizontal-line-segment partial sequence $S'_Q$ to the substantially-horizontal line segments $Q_iQ_{i+1}$ (Qs=j), and selects a substantially-horizontal line segment from substantially-horizontal line segments $Q_{Qj+1}Q_{Qj+1}$ to $Q_{Qe}Q_{Qe+1}$ that form the re-set substantially-horizontal-line-segment partial sequence $S'_Q$.

Particularly in the second embodiment, the search unit 238 selects, as a substantially-vertical line segment and a substantially-horizontal line segment to be subjected to intersection determination next, a substantially-vertical line segment that is positioned at a substantial center of a substantially-vertical-line-segment partial sequence and a substantially-horizontal line segment that is positioned at a substantial center of a substantially-horizontal-line-segment partial sequence.

Accordingly, if the substantially-vertical-line-segment partial sequence $S'_P$ includes substantially-vertical line segment $P_{Ps}P_{Ps+1}$ to $P_iP_{i+1}$, the search unit 238 selects a substantially-vertical line segment $P_{(Ps+i)/2}P_{((Ps+i)/2)+1}$; in contrast, if the substantially-vertical-line-segment partial sequence $S'_P$ includes substantially-vertical line segment $P_iP_{i+1}$ to $P_{Pe}P_{Pe+1}$, the search unit 238 selects a substantially-vertical line segment $P_{(i+Pe)/2}P_{(i+Pe)/2)+1}$. Fractions of (Ps+i)/2 and (i+Pe)/2 can be either rounded up or down.

Similarly, if the substantially-horizontal-line-segment partial sequence $S'_Q$ includes substantially-horizontal line segment $Q_{Qs}Q_{Qs+1}$ to $Q_jQ_{j+1}$, the search unit 238 selects a substantially-horizontal line segment $Q_{(Qs+j)/2}Q_{((Qs+j)/2)+1}$; in contrast, if the substantially-horizontal-line-segment partial sequence $S'_Q$ includes substantially-horizontal line segment $Q_jQ_{j+1}$ to $Q_{Qe}Q_{Qe+1}$, the search unit 238 selects a substantially-horizontal line segment $Q_{(j+Qe)/2}Q_{((j+Qe)/2)+1}$. Fractions of (Qs+j)/2 and (j+Qe)/2 can be either rounded up or down.

In the second embodiment, at start of search, the search unit 238 defines the substantially-vertical-line-segment partial sequence $S'_P$ such that the substantially-vertical-line-segment partial sequence $S'_P$ is the same line segment sequence as the substantially-vertical-line-segment sequence $S_P$ and defines the substantially-horizontal-line-segment partial sequence $S'_Q$ such that the substantially-horizontal-line-segment partial sequence $S'_Q$ is the same line segment sequence as the substantially-horizontal-line-segment sequence $S_Q$. More specifically, the search unit 238 defines the substantially-vertical-line-segment partial sequence $S'_P$ so as to include the substantially-vertical line segment $P_1P_2$ as its first line segment and the substantially-vertical line segment $P_{M-1}P_M$ as its last line segment (Ps=1, Pe=M−1). Similarly, the search unit 238 defines the substantially-horizontal-line-segment partial sequence $S'_Q$ so as to include the substantially-horizontal line segment $Q_1Q_2$ as its first line segment and the substantially-horizontal line segment $Q_{N-1}Q_N$ as its last line segment (Qs=1, Qe=N−1).

The search unit 238 selects, as a substantially-vertical line segment and a substantially-horizontal line segment to be subjected to intersection determination first, a substantially-vertical line segment that is positioned at a substantial center of the substantially-vertical-line-segment partial sequence $S'_P$ (the substantially-vertical-line-segment sequence $S_P$) and a substantially-horizontal line segment that is positioned at a substantial center of the substantially-horizontal-line-segment partial sequence $S'_Q$ (the substantially-horizontal-line-segment sequence $S_Q$). Specifically, the search unit 238 selects a substantially-vertical line segment $P_{(Ps+Pe)/2}P_{((Ps+Pe)/2)+1}$ from the substantially-vertical-line-segment partial sequence $S'_P$ and a substantially-horizontal line segment $Q_{(Qs+Qe)/2}Q_{((Qs+Qe)/2)+1}$ from the substantially-horizontal-line-segment partial sequence $S'_Q$ first and makes intersection determination thereof. Meanwhile, at start of search, Ps=Qs=1, Pe=M−1, and Qe=N−1 hold. Accordingly, as in the first embodiment, the search unit 238 selects a substantially-vertical line segment $P_{M/2}P_{(M/2)+1}$ and a substantially-horizontal line segment $Q_{N/2}Q_{(N/2)+1}$ first and makes intersection determination thereof.

By performing the operations discussed above, the search unit 238 searches for a substantially-vertical line segment and a substantially-horizontal line segment that intersect with each other for each combination of one of the substantially-vertical-line-segment sequences and one of the substantially-horizontal-line-segment sequences calculated by the line-segment-sequence calculating unit 36.

Operations performed by the MFP according to the second embodiment will be described below. Because the process procedure to be performed by the MFP 201 according to the second embodiment is similar to that of the first embodiment (see FIG. 8), description about the procedure is omitted.

Figure 11:
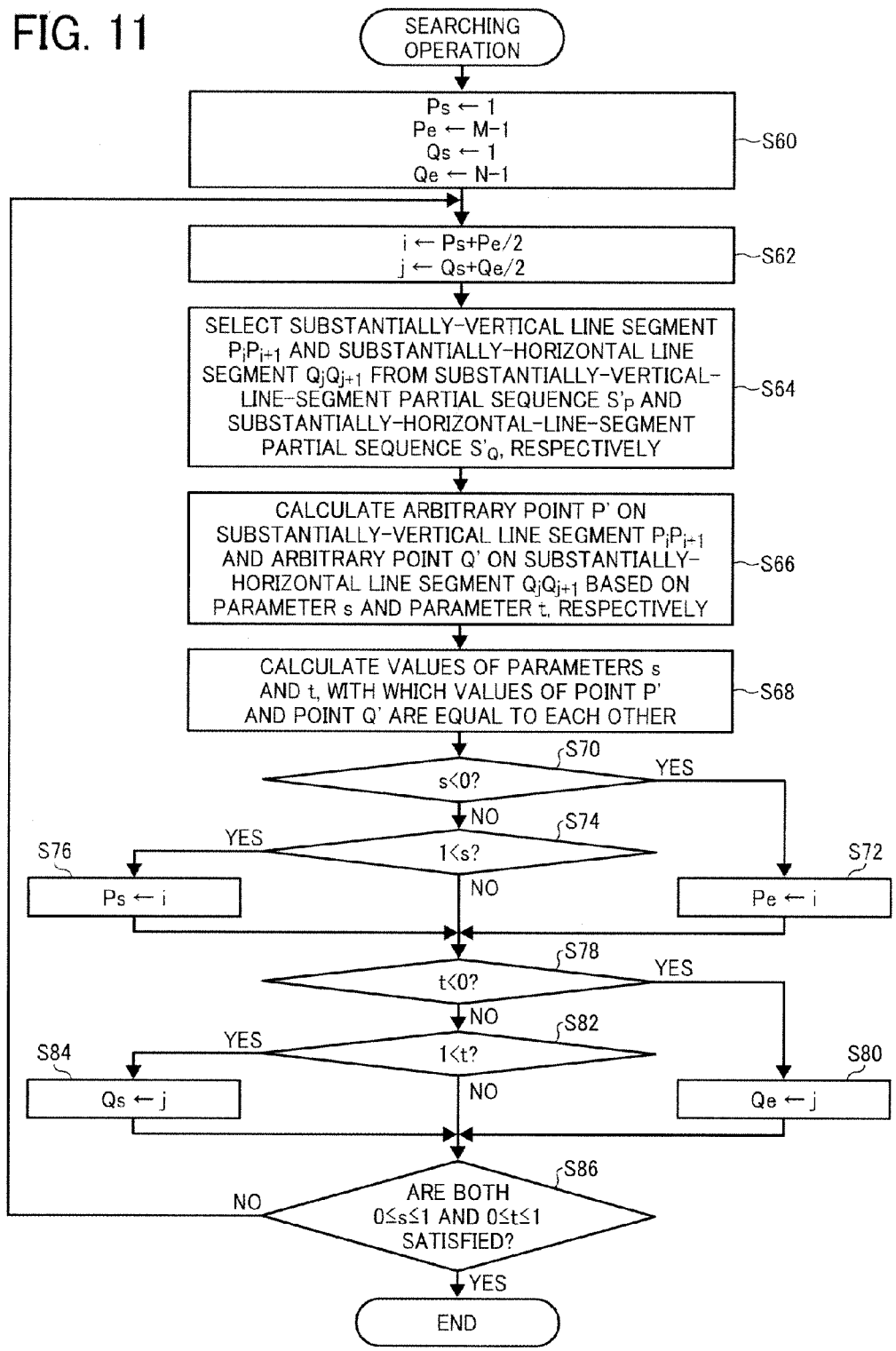
FIG. 11 is a flowchart illustrating an example of a procedure for a searching operation to be performed by the MFP according to the second embodiment.

FIG. 11 is a flowchart illustrating an example of a process procedure for the searching operation illustrated as Step S18 in FIG. 8.

The search unit 238 sets a value of the variable Ps and a value of the variable Pe in the substantially-vertical-line-segment partial sequence $S'_P$ to 1 and M−1, respectively, and sets a value of the variable Qs and a value of the variable Qe in the substantially-horizontal-line-segment partial sequence $S'_Q$ to 1 and N−1, respectively (Step S60).

Subsequently, the search unit 238 sets a value of the variable i to (Ps+Pe)/2 and sets a value of the variable j to (Qs+Qe)/2 (Step S62).

Subsequently, the search unit 238 selects a substantially-vertical line segment $P_iP_{i+1}$ from the substantially-vertical-line-segment partial sequence $S'_P$ and a substantially-horizontal line segment $Q_jQ_{j+1}$ from the substantially-horizontal-line-segment partial sequence $S'_Q$, respectively (Step S64).

Subsequently, the search unit 238 calculates a point P' on the substantially-vertical line segment $P_iP_{i+1}$ based on a value of the parameter s and a point Q' on the substantially-horizontal line segment $Q_jQ_{j+1}$ based on a value of the parameter t (Step S66).

Subsequently, the search unit 238 calculates values of the parameters s and t, with which the value of the point P' and the value of the point Q' are equal to each other (Step S68).

Subsequently, the search unit 238 determines whether the value of the parameter s is less than 0 (Step S70). If the value of the parameter s is less than 0 (Yes at Step S70), the search unit 238 changes i to the value of the variable Pe (Step S72).

In contrast, if the value of the parameter s is not less than 0 (No at Step S70), the search unit 238 further determines whether the value of the parameter s is greater than 1 (Step S74). If the value of the parameter s is greater than 1 (Yes at Step S74), the search unit 238 changes i to the value of the variable Ps (Step S76).

If the value of the parameter s satisfies both a condition of being equal to or greater than 0 (No at Step S70) and a condition of being equal to or less than 1 (No at Step S74), the value of the variable i remains unchanged.

Subsequently, the search unit 238 determines whether the value of the parameter t is less than 0 (Step S78). If the value of the parameter t is less than 0 (Yes at Step S78), the search unit 238 changes j to the value of the variable Qe (Step S80).

In contrast, if the value of the parameter t is not less than 0 (No at Step S78), the search unit 238 further determines whether the value of the parameter t is greater than 1 (Step S82). If the value of the parameter t is greater than 1 (Yes at Step S82), the search unit 238 changes j to the value of the variable Qs (Step S84).

If the value of the parameter t satisfies both a condition of being equal to or greater than 0 (No at Step S78) and a condition of being equal to or less than 1 (No at Step S82), the value of the variable j remains unchanged.

Subsequently, the search unit 238 determines whether each of the values of the parameters s and t satisfies both the condition of being equal to or greater than 0 and the condition of being equal to or less than 1 (Step S86). If each of the values of the parameters s and t satisfies both the condition of being equal to or greater than 0 and the condition of being equal to or less than 1 (Yes at Step S86), the search unit 238 determines that the substantially-vertical line segment $P_iP_{i+1}$ and the substantially-horizontal line segment $Q_jQ_{j+1}$, intersect with each other, by which the searching operation is completed.

In contrast, if each of the value of the parameters s and t does not satisfy both the condition of being equal to or greater than 0 and the condition of being equal to or less than 0 (No at Step S86), control returns to Step S62, where the search unit 238 changes each of the values of the variables i and j, and selects another substantially-vertical line segment $P_iP_{i+1}$ and another substantially-horizontal line segment $Q_jQ_{j+1}$ from a freshly-determined substantially-vertical-line-segment partial sequence $S'_P$ and a freshly-determined substantially-horizontal-line-segment partial sequence $S'_Q$, respectively.

As discussed above, in the second embodiment, a substantially-vertical-line-segment partial sequence, which is a line segment sequence that can intersect with a substantially-horizontal line segment, is defined based on a value of parameter and a substantially-horizontal-line-segment partial sequence, which is a line segment sequence that can intersect with a substantially-vertical line segment, is defined based on a value of parameter. A substantially-vertical line segment that is positioned at a substantial center of the substantially-vertical-line-segment partial sequence and a substantially-horizontal line segment that is positioned at a substantial center of the substantially-horizontal-line-segment partial sequence are selected as a substantially-vertical line segment and a substantially-horizontal line segment to be subjected to intersection determination next. Hence, according to the second embodiment, it is allowed to reduce the number of search times to be equal to or less than $\log_2 M$ or $\log_2 N$, thereby further increasing search efficiency.

Figure 12:
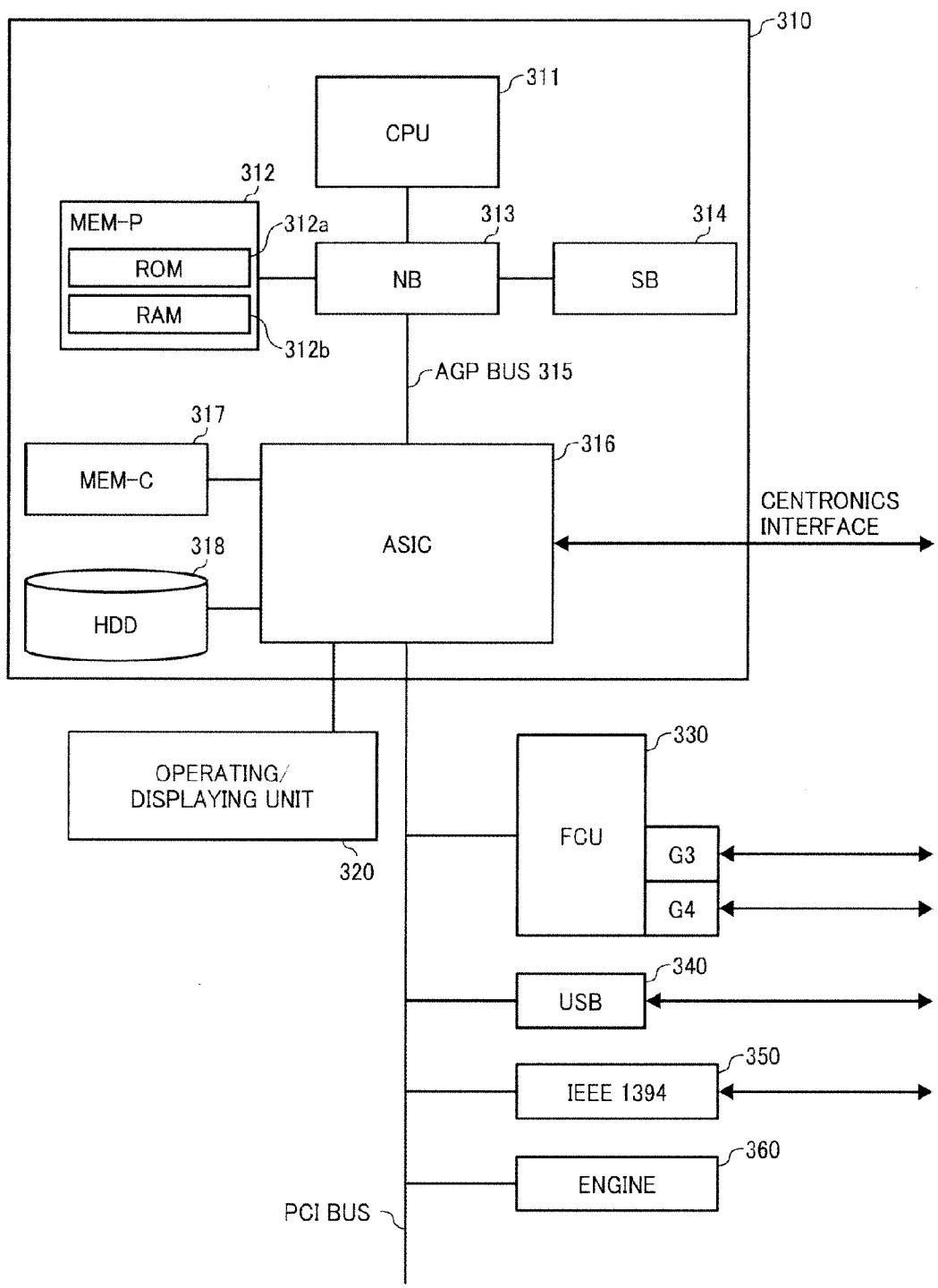
FIG. 12 is a block diagram illustrating an example hardware configuration of the MFP according to the first and second embodiments.

FIG. 12 is a block diagram illustrating an example configuration of the MFP 1, 201 according to the first and second embodiment.

As illustrated in FIG. 12, the MFP 1, 201 is configured such that a controller 310 and an engine unit (Engine) 360 are connected together with a peripheral component interconnect (PCI) bus. The controller 310 is a controller that controls the overall MFP 1, 201, drawing, communication, and inputs entered from an operating/displaying unit 320. The engine unit 360 is a printer engine, or the like, that can be connected to the PCI bus. Examples of the engine unit 360 include a monochrome plotter, a one-drum color plotter, a four-drum color plotter, a scanner, and a facsimile unit. The engine unit 360 includes, in addition to what is called an engine section such as the plotter, an image processing section that performs an error diffusion, a gamma conversion, and the like.

The controller 310 includes a CPU 311, a north bridge (NB) 313, a system memory (MEM-P) 312, a south bridge (SB) 314, a local memory (MEM-C) 317, an application specific integrated circuit (ASIC) 316, and an HDD 318, where an accelerated graphics port (AGP) bus 315 connects between the NB 313 and the ASIC 316. The MEM-P 312 further includes a ROM 312a and a RAM 312b.

The CPU 311 that controls the overall MEP 1, 201 includes a chip set that includes the NB 313, the MEM-P 312, and the SB 314, and is connected to other devices via the chip set.

The NB 313 is a bridge for connecting the CPU 311 to the MEM-P 312, the SB 314, and the AGP bus 315, and includes a memory controller, a PCI master, and an AGP target. The memory controller controls reading and writing from and to the MEM-P 312.

The MEM-P 312 is a system memory for storing computer programs and data, for expanding computer programs and data, for drawing of the printer, and the like, and includes the ROM 312a and the RAM 312b. The ROM 312a is a read only memory for storing computer programs and data. The RAM 312b is a writable and readable memory for expanding computer programs and data, for drawing of the printer, and the like.

The SB 314 is a bridge for connecting the NB 313 to a PCI device and peripheral devices. The SB 314 is connected to the NB 313 via the PCI bus, to which a network interface (I/F) unit, and the like, are also connected.

The ASIC 316 is an integrated circuit (IC) for use in image processing, includes a hardware component for the image processing, and functions as a bridge that connects the AGP bus 315, the PCI bus, the HDD 318, and the MEM-C 317 to each other. The ASIC 316 includes a PCI target and an AGP master, an arbiter (ARS) which is a core of the ASIC 316, a memory controller that controls the MEM-C 317, a plurality of direct memory access controllers (DMACs) that rotate image data by a hardware logic or the like, and a PCI unit that transfers data between the engine unit 360 and the ASIC 316 via the PCI bus. A facsimile control unit (FCU) 330, a universal serial bus (USE) 340, and an IEEE 1394 (the Institute of Electrical and Electronics Engineers 1394) interface 350 are connected to the ASIC 316 via the PCI bus. The operating/displaying unit 320 is directly connected to the ASIC 316.

The MEM-C 317 is a local memory for use as a copy image buffer and a code buffer. The HDD 318 is a storage for accumulating image data, programs, font data, and forms therein.

The AGP bus 315 is a bus interface for a graphics accelerator card introduced to speed up graphics operations and allows direct access to the MEM-P 312 with a high throughput, thereby speeding up operations related to the graphic accelerator card.

Information-extraction computer program to be executed by the MFP 1, 201 according to the present embodiment can be provided in a form of being preinstalled on a ROM or the like.

The information-extraction computer program to be executed by the MFP 1, 201 according to the present embodiment can be configured so as to be recorded in a computer-readable storage medium, such as a compact disc-read-only memory (CD-ROM), a flexible disk (FD), a CD recordable (CD-R), or a digital versatile disk (DVD), in an installable or executable format.

The information-extraction computer program to be executed by the MFP 1, 201 according to the present embodiment can alternatively be configured so as to be stored in a computer connected to a network such as the Internet so that the computer program can be downloaded via the network. Further alternatively, the information-extraction computer program to be executed by the MFP 1, 201 according to the present embodiment can be configured so as to be provided or distributed via a network such as the Internet.

The information-extraction computer program to be executed by the MFP 1, 201 according to the present embodiment has a module configuration that causes the units discussed above (the operation receiving unit, the reading control unit, the line-segment-sequence calculating unit, the search unit, the intersection-point calculating unit, the extracting unit, the display control unit, the communication control unit, the printing control unit, and the like) to be implemented on a computer. From a viewpoint of actual hardware, the CPU (processor) 311 reads the information-extraction computer program from the ROM 312a to the RAM 312b and executes the information-extraction computer program on the RAM 312b, whereby the units (the operation receiving unit, the reading control unit, the line-segment-sequence calculating unit, the search unit, the intersection-point calculating unit, the extracting unit, the display control unit, the communication control unit, the printing control unit, and the like) are implemented on the computer.

The present invention is not limited to the embodiments discussed above and susceptible to various modifications.

For instance, in the embodiments discussed above, examples where the information extraction apparatus is applied to an MFP have been described, however, the apparatus can alternatively be applied to a server apparatus or a personal computer.

FIG. 13 is a block diagram illustrating an example of the configuration of an information extraction system according to a modification. The information extraction system includes a server 401 and an image reading apparatus 408.

The image reading apparatus 408 obtains image data by reading a printed material (e.g., a printed material in which information is embedded by additionally printing multiple types of dot patterns in a matrix). Examples of the image reading apparatus 408 include an MFP and a scanner. The image reading apparatus 408 transmits the thus-obtained image data to the server 401 via a network 405, and receives a result of extraction of the embedded information, a result of alteration detection performed based on the embedded information, and the like via the network 405.

As illustrated in FIG. 13, the server 401 includes an operating unit 412, a display unit 414, a storage unit 416, a communication unit 420, and a control unit 430. The control unit 430 includes a communication control unit 434, a line-segment-sequence calculating unit 436, a search unit 438, an intersection-point calculating unit 440, an extracting unit 442, a display control unit 444, and an operation receiving unit 446. What generally makes the server 401 differ from the MFP 1, 201 is the communication unit 420 and the communication control unit 434. Accordingly, the configurations of the communication unit 420 and the communication control unit 434 are described below, and descriptions about configurations of other elements that are similar to those of the other embodiments are omitted.

The communication unit 420 receives image data via the network 405 from the image reading apparatus 408 that obtains image data by reading a printed material, in which information is embedded by additionally printing multiple types of dot patterns in a matrix. The communication unit 420 also transmits a result of extraction of information embedded in image data (printed material), a result of alteration detection performed based on the embedded information, and the like to the image reading apparatus 408 via the network 405.

The communication control unit 434 (an example of an obtaining unit) instructs the communication unit 420 to transmit information to the image reading apparatus 408 and causes the communication unit 420 to receive information transmitted from the image reading apparatus 408. For instance, the communication control unit 434 causes the communication unit 420 to receive image data that is transmitted from the image reading apparatus 408 and that has multiple types of dot patterns arranged in a matrix in its background, thereby obtaining the image data.

The line-segment-sequence calculating unit 436, the search unit 438, the intersection-point calculating unit 440, the extracting unit 442, and the like perform the operations discussed above in the embodiments on the image data obtained by the communication control unit 434 to thereby extract information embedded in the image data As discussed above, the information extraction apparatus according to an aspect of the present invention can be applied to a server apparatus or a personal computer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information extraction apparatus comprising:
   an obtaining unit that obtains image data that includes therein information that are printed with multiple types of patterns in a matrix therein;

a line-segment-sequence calculating unit that calculates a plurality of vertical-line-segment sequences, each of which is obtained by connecting patterns arranged in a vertical row in the image data with a particular polygonal line, and calculates a plurality of horizontal-line-segment sequences, each of which is obtained by connecting patterns arranged in a horizontal row in the image data with another polygonal line;

a search unit that searches, for each combination of one vertical-line-segment sequence of the vertical-line-segment sequences and one horizontal-line-segment sequence of the horizontal-line-segment sequences, vertical line segments that form the one vertical-line-segment sequence and horizontal line segments that form the one horizontal-line-segment sequence for a vertical line segment and a horizontal line segment that intersect with each other;

an intersection-point calculating unit that calculates a point of intersection between the vertical line segment and the horizontal line segment having been found by the search unit as a position of a pattern; and an extracting unit that extracts the information by identifying types of patterns at the points, calculated by the intersection-point calculating unit, of intersection between the vertical line segments and the horizontal line segments, wherein the search unit selects a vertical line segment and a horizontal line segment to be subjected to intersection determination calculates a point of intersection between the selected vertical line segment or an extension thereof and the selected horizontal line segment or an extension thereof by using values of parameters, and determines whether the vertical line segment and the horizontal line segment intersect with each other based on the values of the parameters, and wherein if the vertical line segment and the horizontal line segment are determined not to be intersecting with each other based on the values of the parameters the search unit selects a vertical line segment and a horizontal line segment to be subjected to intersection determination next based on the values of the parameters.

2. The information extraction apparatus according to claim 1, wherein the search unit selects, based on the values of the parameters, the vertical line segment and the horizontal line segment to be subjected to intersection determination next from among vertical line segments connected to the vertical line segment determined not to be intersecting and from among horizontal line segments connected to the horizontal line segment determined not to be intersecting.

3. The information extraction apparatus according to claim 1, wherein the search unit defines a vertical-line-segment partial sequence that is a line segment sequence that possibly intersects with a horizontal line segment, defines a horizontal-line-segment partial sequence that is a line segment sequence that possibly intersects with a vertical line segment, and selects the vertical line segment and the horizontal line segment to be subjected to intersection determination next from the vertical-line-segment partial sequence and the horizontal-line-segment partial sequence based on the values of the parameters.

4. The information extraction apparatus according to claim 3, wherein the search unit selects, as the vertical line segment and the horizontal line segment to be subjected to intersection determination next, a vertical line segment that is positioned at a substantial center of the vertical-line-segment partial sequence and a horizontal line segment that is positioned at a substantial center of the horizontal-line-segment partial sequence.

5. The information extraction apparatus according to claim 1, wherein the search unit selects, as a vertical line segment and a horizontal line segment to be subjected to intersection determination initially, a vertical line segment that is positioned at a substantial center of the vertical-line-segment sequence and a horizontal line segment that is positioned at a substantial center of the horizontal-line-segment sequence.

6. The information extraction apparatus according to claim 1, wherein each of the vertical-line-segment sequences is a sequence of line segments obtained by connecting patterns arranged in a vertical row in the image data with a particular polygonal line in an order of coordinate values that define vertical positions, and each of the horizontal-line-segment sequences is a sequence of line segments obtained by connecting patterns arranged in a horizontal row in the image data with another polygonal line in an order of coordinate values that define horizontal positions.

7. The information extraction apparatus according to claim 1, wherein the obtaining unit controls a reading unit to read the printed material to obtain image data.

8. The information extraction apparatus according to claim 1, wherein the obtaining unit obtains the image data via a network from a reading apparatus that reads the printed material to obtain the image data.

9. An information extraction method comprising:

(a) obtaining image data that includes therein information that are printed with multiple types of patterns in a matrix therein, the obtaining being performed by an obtaining unit;

(b) calculating a plurality of vertical-line-segment sequences, each of which is obtained by connecting patterns arranged in a vertical row in the image data with a particular polygonal line, and calculating a plurality of horizontal-line-segment sequences, each of which is obtained by connecting patterns arranged in a horizontal row in the image data with another polygonal line, the calculating being performed by a line-segment-sequence calculating unit;

(c) searching, for each combination of one vertical-line-segment sequence of the vertical-line-segment sequences and one horizontal-line-segment sequence of the horizontal-line-segment sequences, vertical line segments that form the one vertical-line-segment sequence and horizontal line segments that form the one horizontal-line-segment sequence for a vertical line segment and a horizontal line segment that intersect with each other, the searching being performed by a search unit;

(d) calculating a point of intersection between the vertical line segment and the horizontal line segment having been found by the search unit as a position of a pattern, the calculating being performed by an intersection-point calculating unit; and (e) extracting the information by identifying types of patterns at the points, calculated by the intersection-point calculating unit, of intersection between the vertical line segments and the horizontal line segments, the extracting being performed by an extracting unit, wherein in (c), the search unit selects a vertical line segment and a horizontal line segment to be subjected to intersection determination, calculates a point of intersection between the selected vertical line segment or an extension thereof and the selected horizontal line segment or an extension thereof by using values of parameters, and determines whether the vertical line segment and the horizontal line segment intersect with each other based on the values of the parameters, and if the vertical line segment and the horizontal line segment are determined not to be intersecting with each other based on the values of the parameters, the search unit selects a vertical line segment and a horizontal line segment to be subjected to intersection determination next based on the values of the parameters.

10. An information-extraction computer program product comprising a non-transitory computer-readable storage medium having computer-readable program codes embodied in the storage medium, the program codes, when executed, causing a computer to perform an information extraction method comprising:

(a) obtaining image data that includes therein information that are printed with multiple types of patterns in a matrix therein;

(b) calculating a plurality of vertical-line-segment sequences, each of which is obtained by connecting patterns arranged in a vertical row in the image data with a particular polygonal line, and calculating a plurality of horizontal-line-segment sequences, each of which is obtained by connecting patterns arranged in a horizontal row in the image data with another polygonal line;

(c) searching, for each combination of one vertical-line-segment sequence of the vertical-line-segment sequences and one horizontal-line-segment sequence of the horizontal-line-segment sequences, vertical line segments that form the one vertical-line-segment sequence and horizontal line segments that form the one horizontal-line-segment sequence for a vertical line segment and a horizontal line segment that intersect with each other;

(d) calculating a point of intersection between the vertical line segment and the horizontal line segment having been found by the search unit as a position of a pattern; and (e) extracting the information by identifying types of patterns at the points, calculated by the intersection-point calculating unit, of intersection between the vertical line segments and the horizontal line segments, wherein (c) is performed by a search unit, and the search unit selects a vertical line segment and a horizontal line segment to be subjected to intersection determination, calculates a point of intersection between the selected vertical line segment or an extension thereof and the selected horizontal line segment or an extension thereof by using values of parameters, and determines whether the vertical line segment and the horizontal line segment intersect with each other based on the values of the parameters, and if the vertical line segment and the horizontal line segment are determined not to be intersecting with each other based on the values of the parameters, the search unit selects a vertical line segment and a horizontal line segment to be subjected to intersection determination next based on the values of the parameters.

\* \* \* \* \*